Patented Feb. 28, 1933

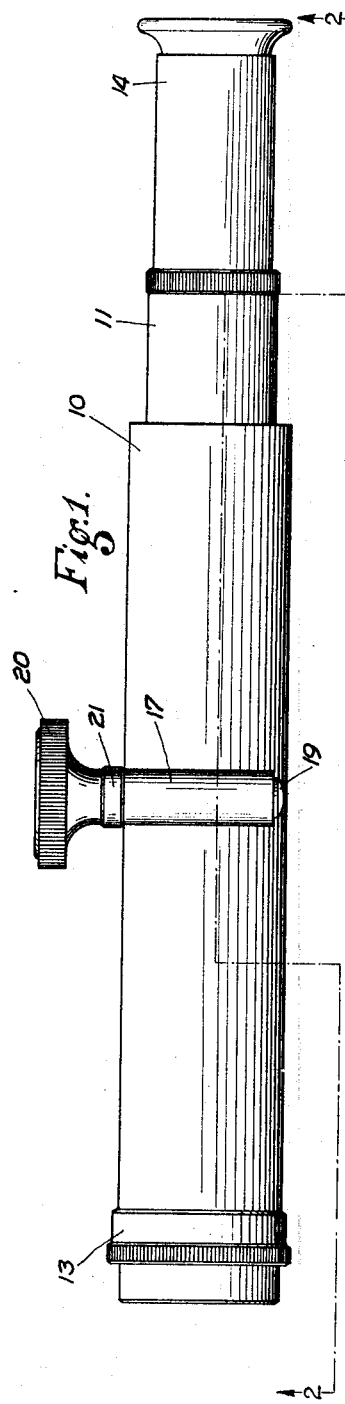
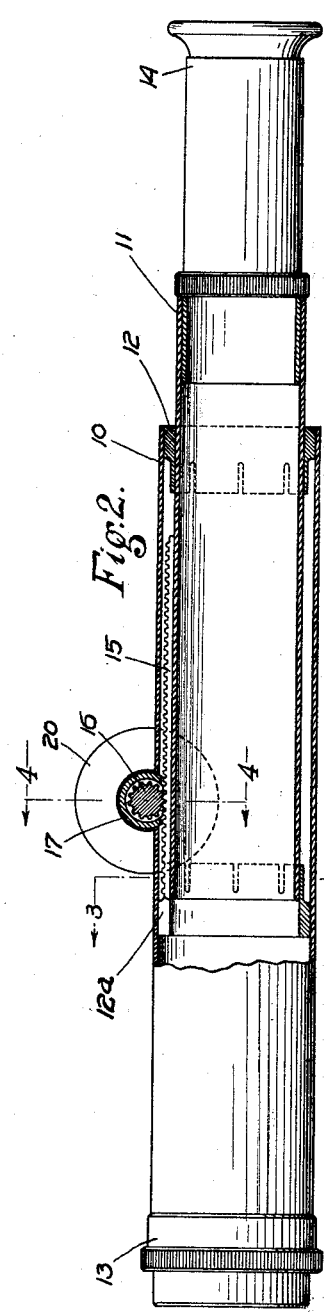
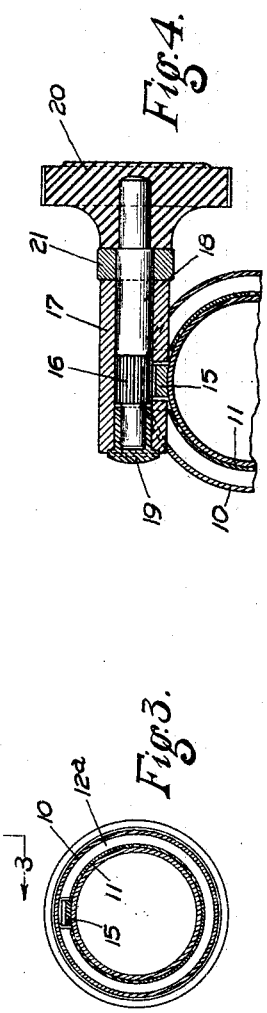

1,899,192

UNITED STATES PATENT OFFICE

WILLIAM GAERTNER, OF CHICAGO, ILLINOIS

PRECISION INSTRUMENT

Application filed December 31, 1930. Serial No. 505,679.

This invention has to do with the means employed for manipulating the movable element of precision instruments in which delicate linear adjustments are required, and, in particular, it provides an improvement for those devices in which a rack and pinion are employed to impart the adjusting movements.

In microscopes, telescopes and other instruments in which focusing adjustments are required, a smooth, positive and precise adjustment of the draw tube is essential to satisfactory use and it is of great importance that there be no failure in any of these respects when such instruments are employed for scientific research and determinations.

Optical instruments of various kinds have been provided with rack and pinion means for effecting focusing adjustments, but the mounting and operation of such means have not compared favorably with the minuteness of detail that characterizes the construction and assembly of the optical parts of the instrument.

The principal object of the present invention is to provide an arrangement and mounting of the means for manipulating the movable element of a longitudinally adjustable instrument or apparatus that will be firm, positive and permanent and still permit of the most delicate of adjustments.

Another object is to improve the appearance of the device and to minimize the opportunity for even a slight disarrangement of the parts.

Other objects and advantages of the invention will become apparent upon reading the following specification and examining the accompanying drawing of the improved adjusting means as applied to a simple telescope.

In the drawing, Fig. 1 is an elevational view of that side of the telescope on which the adjusting means are mounted;

Fig. 2 is partly in elevation and partly in longitudinal section along the line 2—2 of Fig. 1;

Fig. 3 is a cross sectional view taken on the line 3—3 of Fig. 2; and

Fig. 4 is a cross sectional view on the line 4—4 of Fig. 2, showing in detail the arrangement, assembly and mounting of the elements of the adjusting means.

Referring now in detail to the drawing, the numeral 10 designates the body tube of a telescope, within which is disposed a draw tube 11, snugly and slidably fitting in spring-sleeves 12, 12a. The body tube is threaded on its outer end to receive a telescope objective 13, and the draw tube, at its inner end, carries an eyepiece 14 which is fitted friction tight therein in the usual manner for smooth adjustment.

Secured to the outer wall of the draw tube 11 and longitudinal thereof is a rack 15. The sleeve 12a is slotted, as shown in Fig. 3, to permit the rack to pass therethrough and to form a guide for its longitudinal movement.

At about the center of the body tube, a portion of its wall, sufficient to expose the rack and to permit the insertion of a pinion 16, for engagement with the rack, is cut away and replaced by a transverse bearing sleeve 17, having an opening in the bottom thereof corresponding to the shape and size of the cut away portion of the body tube. The bearing sleeve is fixedly secured to the body tube by soldering, brazing, welding, or any other means which will afford an unyielding and leak-proof attachment.

The pinion 16 is formed on a shaft 18, one end of which is of reduced diameter and is inserted into an end cap 19, which cap is in friction tight engagement with the corresponding end of the bearing sleeve 17 and limits the endwise movement of the shaft. The other end of the shaft is of slightly reduced diameter, and has fixedly secured thereto a knurled head 20 which latter abuts, but is rotatable on, the friction collar 21.

The intermediate portions of the pinion shaft 18 are in frictional engagement with the inner wall of the bearing sleeve 17, with the result that a degree of resistance is offered to manipulation of the head 20, thus insuring that any movement of the draw tube through the cooperation of the rack, pinion and head will be positive and smooth and that when the desired adjustment is attained the parts will remain in their correct relative positions.

By attaching the bearing sleeve in a non-removable manner and avoiding the use of screws in the assembly and mounting of the adjustment means, I provide a device that is capable of precise and steady manipulation throughout its life, is impervious to moisture, is neat and sturdy and can be manufactured economically.

The invention is susceptible of a wide range of application. In addition to its usefulness for microscopes and telescopes, it may be employed to advantage in range finders and other military instruments, on elevating stands and, in fact, on any device in which a delicate linear movement of one of the parts is required.

I claim:

1. In a precision instrument, a draw tube having a rack mounted longitudinally thereon, a body tube embracing said draw tube and having an opening adjacent said rack, a unitary bearing sleeve enclosing said opening and integral with said body tube, a shaft frictionally mounted in said sleeve, a pinion rotated by said shaft and meshing with said rack, operating mechanism on one end of said shaft and abutting the corresponding end of said bearing sleeve, and a cap frictionally engaging the opposite end of said shaft and said bearing sleeve.

2. In a precision instrument, a draw tube having a rack mounted longitudinally thereon, a body tube embracing said draw tube and having an opening adjacent said rack, an extended unitary bearing sleeve integral with said body tube and enclosing said opening therein, a rotatable shaft extending through said bearing sleeve and frictionally engaging the same, a pinion intermediate the ends of said shaft and operatively connected to said rack, operating mechanism secured to one end of said shaft and abutting said bearing sleeve, and a push-fit cap engaging the other end of said shaft and abutting said bearing sleeve.

In testimony whereof I have hereunto subscribed my name.

WILLIAM GAERTNER.